(12) United States Patent
Zhang et al.

(10) Patent No.: US 11,668,510 B2
(45) Date of Patent: Jun. 6, 2023

(54) REFRIGERATOR

(71) Applicant: QINGDAO HAIER CO., LTD., Qingdao (CN)

(72) Inventors: Hao Zhang, Qingdao (CN); Chun Yang, Qingdao (CN); Jianquan Chen, Qingdao (CN); Enpin Xia, Qingdao (CN)

(73) Assignee: QINGDAO HAIER CO., LTD., Qingdao (CN)

( * ) Notice: Subject to any disclaimer, the term of this patent is extended or adjusted under 35 U.S.C. 154(b) by 432 days.

(21) Appl. No.: 16/643,521

(22) PCT Filed: Dec. 7, 2018

(86) PCT No.: PCT/CN2018/119770
§ 371 (c)(1),
(2) Date: Feb. 28, 2020

(87) PCT Pub. No.: WO2019/114624
PCT Pub. Date: Jun. 20, 2019

(65) Prior Publication Data
US 2021/0025638 A1    Jan. 28, 2021

(30) Foreign Application Priority Data
Dec. 11, 2017 (CN) .......................... 201711310083.4

(51) Int. Cl.
*F25D 17/04* (2006.01)
*A23L 3/3418* (2006.01)
(Continued)

(52) U.S. Cl.
CPC .......... *F25D 17/042* (2013.01); *A23L 3/3418* (2013.01); *A23L 3/363* (2013.01);
(Continued)

(58) Field of Classification Search
CPC .......... F25D 2317/043; F25D 2201/30; F25D 23/063; F25D 17/042; F04D 29/663;
(Continued)

(56) References Cited

U.S. PATENT DOCUMENTS 4,235,303 A * 11/1980 Dhoore .................. B64D 33/02
                                                                428/6
11,255,597 B2 * 2/2022 Zhang .................. F25D 23/087
(Continued)

FOREIGN PATENT DOCUMENTS

| AU | 2018382028 B2 * | 5/2021 | .......... F04B 39/0033 |
| CN | 201433881 Y | 3/2010 | |

(Continued)

*Primary Examiner* — Ljiljana V. Cinc
(74) *Attorney, Agent, or Firm* — Cheng-Ju Chiang (57) ABSTRACT

A vacuum assembly for a refrigerator includes upper and lower sealing bodies, which are buckled to define a sealed cavity. A vacuum pump is provided in the cavity. A plurality of sheet members are arranged between the vacuum pump and a sealing box. A plurality of abutting parts are provided on the upper sealing body and abutting against tops of the sheet members. A step is provided at an end of the abutting part coming into contact with the sheet member. A top surface of the step abuts against the sheet member, and a side surface of the step abuts against the sheet member. A plurality of ribs are provided on the lower sealing body and spaced apart from the side walls to define limiting grooves. A plurality of guide grooves are provided on the lower sealing body and extend in a vertical direction to guide the sheet members.

16 Claims, 11 Drawing Sheets

(51) Int. Cl.
  *A23L 3/36* (2006.01)
  *F04D 29/60* (2006.01)
  *F04D 17/16* (2006.01)
  *F04D 29/66* (2006.01)

(52) U.S. Cl.
  CPC ......... *F04D 17/168* (2013.01); *F04D 29/602* (2013.01); *F04D 29/663* (2013.01); *A23V 2002/00* (2013.01); *F25D 2201/30* (2013.01); *F25D 2317/043* (2013.01)

(58) Field of Classification Search
  CPC .... F04D 29/664; F04D 17/168; F04D 29/602; B65D 90/026; E04B 2/00; E04B 1/00; E04B 5/00; E04B 2103/00; F04B 53/002; A23L 3/3418; A23L 3/363; A23V 2002/00
  See application file for complete search history.

(56) References Cited

U.S. PATENT DOCUMENTS

| | | | |
|---|---|---|---|
| 11,549,499 B2* | 1/2023 | Yang | F25D 17/062 |
| 2020/0068924 A1* | 3/2020 | Zhu | A23L 3/3418 |
| 2021/0025638 A1* | 1/2021 | Zhang | F04D 17/168 |
| 2021/0071656 A1* | 3/2021 | Yang | F25D 17/062 |

FOREIGN PATENT DOCUMENTS

| | | | | |
|---|---|---|---|---|
| CN | 203272090 U | | 11/2013 | |
| CN | 203796525 U | * | 8/2014 | |
| CN | 205669490 U | * | 11/2016 | |
| CN | 205955996 U | | 2/2017 | |
| CN | 106593819 A | | 4/2017 | |
| CN | 106593820 A | | 4/2017 | |
| CN | 106593822 A | | 4/2017 | |
| CN | 107989774 A | | 5/2018 | |
| CN | 108131277 A | | 6/2018 | |
| CN | 108150388 A | | 6/2018 | |
| CN | 108195126 A | | 6/2018 | |
| CN | 108253701 A | | 7/2018 | |
| CN | 108253716 A | | 7/2018 | |
| CN | 108302008 A | | 7/2018 | |
| EP | 3726101 A1 | * | 10/2020 | ............. F16J 15/064 |
| EP | 3726171 A1 | * | 10/2020 | .......... F04B 39/0033 |
| EP | E P-3726166 A1 | * | 10/2020 | ........... A23L 3/3418 |
| EP | E P-3726168 A1 | * | 10/2020 | .......... F04B 39/0033 |
| EP | 3553432 B1 | * | 1/2021 | ........... A23L 3/3418 |
| JP | 2004-293827 A | | 10/2004 | |
| WO | WO-2005085099 A1 | * | 9/2005 | ........... B65D 90/026 |
| WO | WO-2021114960 A1 | * | 6/2021 | ............. F25D 11/02 |

* cited by examiner

REFRIGERATOR

The present application is a 35 U.S.C. § 371 National Phase conversion of International (PCT) Patent Application No. PCT/CN2018/119770, filed on Dec. 7, 2018, which claims priority to Chinese Patent Application No. 201711310083.4, filed on Dec. 11, 2017 and titled "Vacuum assembly with plate soundproof part and refrigerator", which is incorporated herein by reference in its entirety. The PCT International Patent Application was filed and published in Chinese.

TECHNICAL FIELD

The present invention relates to the technical field of noise reduction for refrigerating equipment, and in particular, to a seal for reducing noises of a vacuum pump.

BACKGROUND

Keeping fresh of foods in a refrigerator is closely related to temperature, humidity and gaseous environment. Among other things, oxygen is an important factor causing food spoilage and bacterial reproduction. The food may be kept fresh longer significantly by pumping the oxygen in a compartment to control a nitrogen-oxygen ratio of the refrigerator.

The oxygen may be pumped out of a specific space with a vacuum pump and be discharged outside the refrigerator. However, as a medium which conducts sounds, the oxygen will conduct noises in a cabinet into a space outside the refrigerator when discharged, thus causing noise interference.

SUMMARY

An object of the present invention is to provide a sealing device to solve the problem of noise output of the cabinet.

In order to achieve the above-mentioned inventive object, the present invention provides a soundproof vacuum assembly for a refrigerator, comprising a sealing box for accommodating a vacuum pump, wherein the sealing box comprises upper and lower sealing bodies which are buckled to define an accommodating cavity in which the vacuum pump is placed; the vacuum assembly further comprises an air pipe member comprising an air inlet pipe, an air outlet pipe and a base plate which are molded integrally, and the air inlet pipe and the air outlet pipe penetrate through the base plate; a notch is provided on the sealing box, and an outer edge of the base plate and the notch have fitted shapes; wherein the vacuum pump is connected with a silencer.

As a further improvement of an embodiment of the present invention, a sealing unit is disposed between the notch and the substrate.

As a further improvement of an embodiment of the present invention, a flange is provided on a periphery of the notch, a groove is provided on the outer edge of the base plate, and the flange is fitted with the groove.

As a further improvement of an embodiment of the present invention, the sealing unit is disposed at a fit clearance between the flange and the groove.

As a further improvement of an embodiment of the present invention, the sealing unit is made of an elastic material.

As a further improvement of an embodiment of the present invention, the sealing unit is configured as an annular shape.

As a further improvement of an embodiment of the present invention, the silencer comprises a hollow cavity enclosed by first and second bottom surfaces and side walls together, wherein the first and second bottom surfaces are connected through the side walls, an air inlet is disposed at an end of the silencer, an air outlet is disposed at the other end, the cavity is divided axially into a plurality of chambers which comprise a first chamber adjacent to the first bottom surface, a second chamber adjacent to the second bottom surface and a middle chamber located between the first and second chambers, the air inlet is communicated with the middle chamber, the middle chamber is communicated with the second chamber, the first chamber is communicated with the second chamber, and the air outlet is communicated with the first chamber.

As a further improvement of an embodiment of the present invention, the silencer comprises a hollow cavity enclosed by first and second bottom surfaces and side walls together, wherein the first and second bottom surfaces are connected through the side walls, the air inlet is disposed at the first bottom surface, the air outlet is disposed at the second bottom surface, the air inlet is communicated with the cavity through a first duct, the cavity is communicated with the air outlet through a second duct, a distal end of the first duct is close to the second bottom surface, and a proximal end of the second duct is close to the first bottom surface.

As a further improvement of an embodiment of the present invention, the silencer comprises a housing and a duct provided in the housing, wherein the hollow cavity is enclosed by the housing, the air inlet is provided at a proximal end of the housing, the air outlet is provided at a distal end of the housing, the air inlet is communicated with the air outlet through the duct, the duct is filled with a medium, and a plurality of through holes are formed in a side wall of the duct to communicate the duct with the cavity.

In order to achieve the above-mentioned object, an embodiment of the present invention provides a refrigerator, comprising a cabinet in which a fresh keeping space is provided, and further comprising any one of the vacuum assemblies as described above, wherein the vacuum assembly is connected with the fresh keeping space.

Compared with a prior art, the vacuum assembly for a refrigerator according to the present invention is configured as an air pipe member which is molded integrally, thereby facilitating the assembly of the vacuum pump, realizing sealing and sound insulation and preventing vibration noises of the vacuum pump from being conducted through the sealing box.

DETAILED DESCRIPTION

The present invention will be described in detail below with reference to the specific embodiments shown in the accompanying drawings. However, these embodiments are not intended to limit the present invention, and modifications in structures, methods, or functions made by those common skilled in the art according to these embodiments are all included in the protection scope of the present invention.

All terms which indicate positions and directions are described in the present invention with reference to a vacuum pump, an end close to the vacuum pump is configured as a proximal end, and an end away from the vacuum pump is configured as a distal end.

Figure 1:
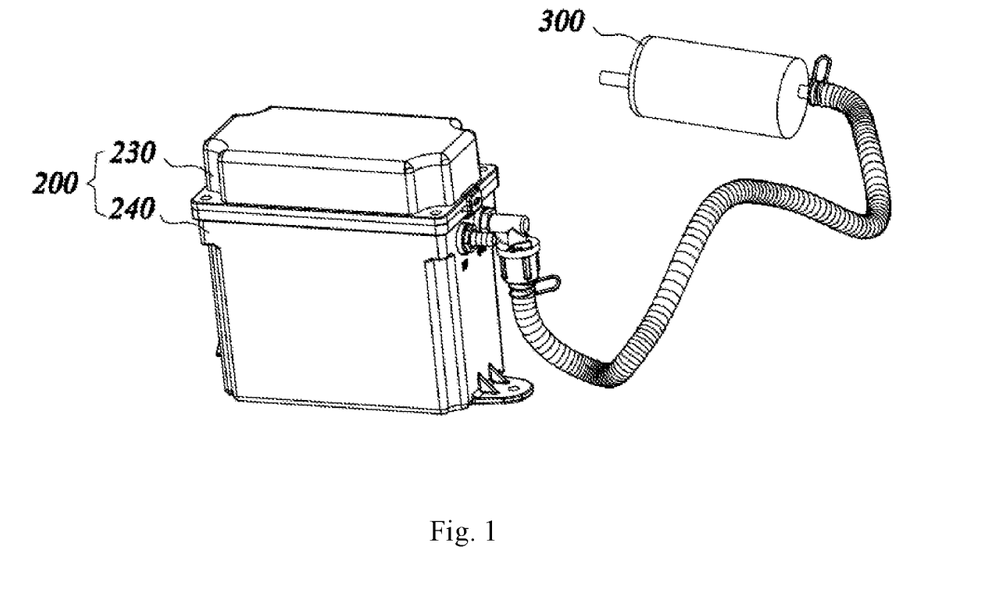
FIG. 1 is a schematic structural diagram of a sealing box according to an embodiment of the present invention.
Figure 2:
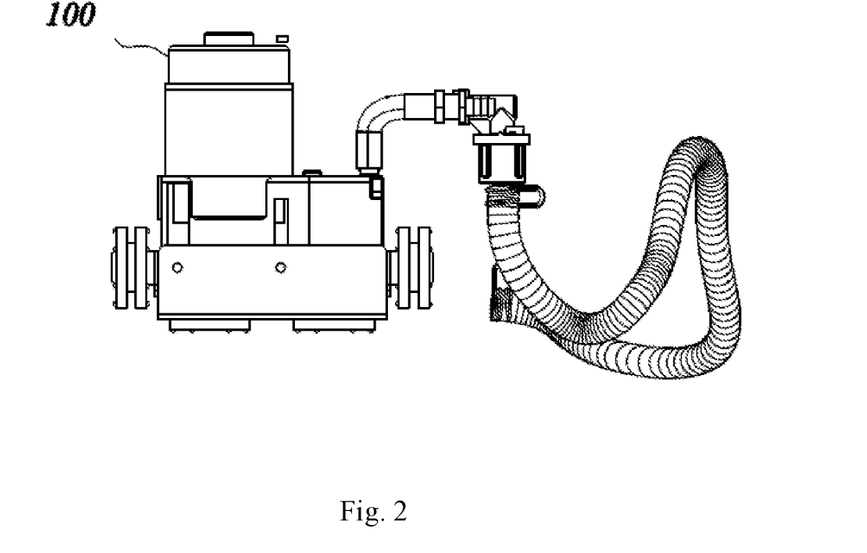
FIG. 2 is a schematic diagram of components inside and outside the sealing box according to an embodiment of the present invention.
Figure 3:
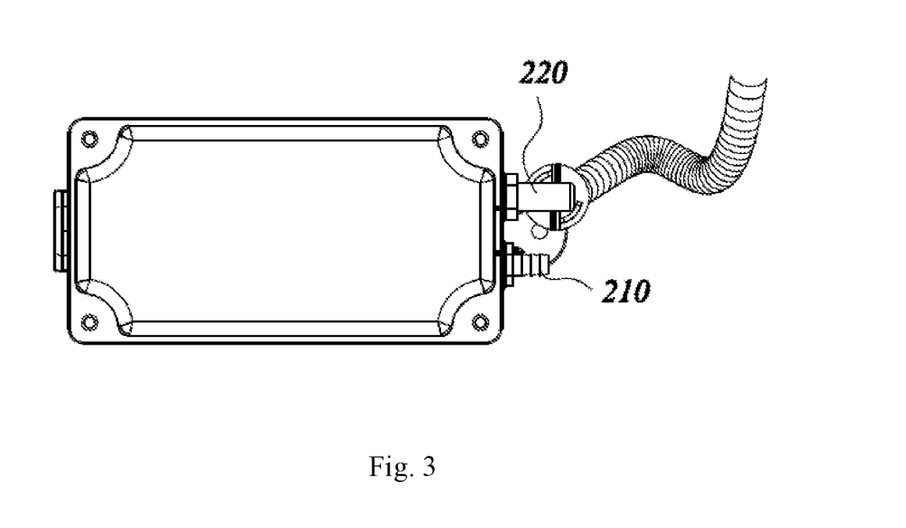
FIG. 3 is a top view of the sealing box according to an embodiment of the present invention.

Referring to FIGS. 1 to 3, in an embodiment of the present invention, the vacuum pump 100 is accommodated in a sealing box 200 and communicated with external air through an air inlet pipe 210 and an air outlet pipe 220. In the embodiment, the proximal end of the air inlet pipe 210 is communicated with an air inlet pipeline of the vacuum pump 100, and the distal end is communicated with a fresh keeping space (not shown) in a compartment of a refrigerator; the proximal end of the air outlet pipe 220 is communicated with an air outlet pipeline of the vacuum pump 100, and the distal end extends towards an exterior of the sealing box 200. The sealing box 200 disconnects air communication between the vacuum pump 100 and a mounting environment to achieve a soundproof effect. The fresh keeping space may be configured as an independent compartment, or as a closed or semi-closed space located at a part of a compartment.

The sealing box 200 comprises upper and lower sealing bodies 230 and 240. The upper sealing body 230 comprises a top wall and side walls, all of which are molded integrally and define together an accommodating cavity with an opening at a lower end, the lower sealing body 240 comprises a bottom wall and side walls, all of which are molded integrally and define together an accommodating cavity with an opening at an upper end, and the openings of the upper and lower sealing bodies 230, 240 are fitted and may be buckled to each other to form an accommodating space for the vacuum pump 100.

Preferably, the upper and lower sealing bodies 230 and 240 are made of plastics.

Figure 4:
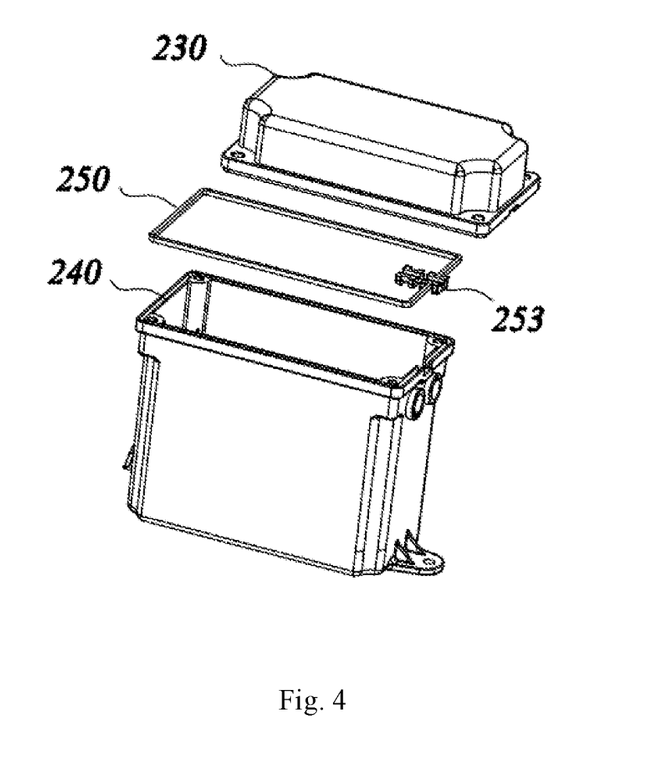
FIG. 4 is a schematic exploded diagram of the sealing box according to an embodiment of the present invention.

Referring to FIG. 4, a seal is provided between the upper and lower sealing bodies 230 and 240. A first groove is formed at lower edges of the side walls of the upper sealing body 230, a second groove is formed at upper edges of the side walls of the lower sealing body 240, and the first groove is cooperated with the second groove to form a mounting groove for a seal ring 250. As such, the upper and lower sealing bodies 230 and 240 may be guaranteed to be airtight after buckled, and sounds are prevented from being conducted out through a joint gap of the sealing box 200. The seal ring 250 is annular, has a circular section, is made of an elastic material and has a mounting stretch amount of 2-5% when sleeved in the mounting groove. When the upper sealing body 230 is buckled with the lower sealing body 240, the seal ring 250 is pressed to form a compression amount of 20-30%, thereby guaranteeing a sealing effect.

Figure 5:
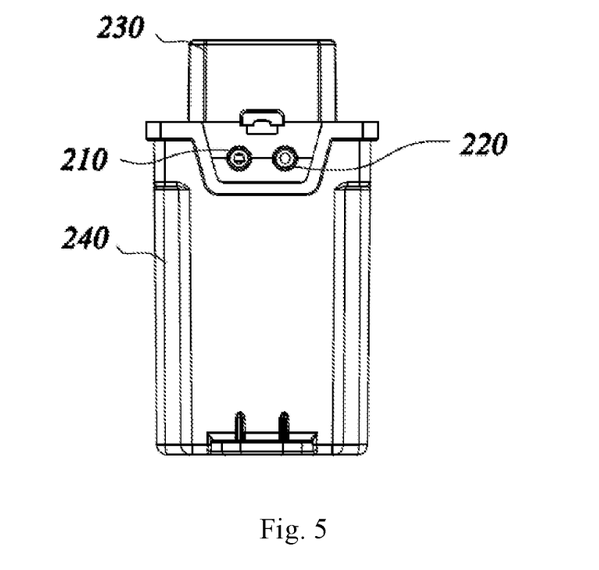
FIG. 5 is a front view of the sealing box according to an embodiment of the present invention.

As shown in FIGS. 4 and 5, a notch 251 is provided at a position where the upper sealing body 230 is jointed with the lower sealing body 240, for passing a wire connected with the vacuum pump 100. In order to guarantee sealability of the sealing box 200, a seal section 253 capable of being buckled is provided at the notch 251. The seal section 253 is made of an elastic material and molded integrally with the seal ring 250.

Figure 6:
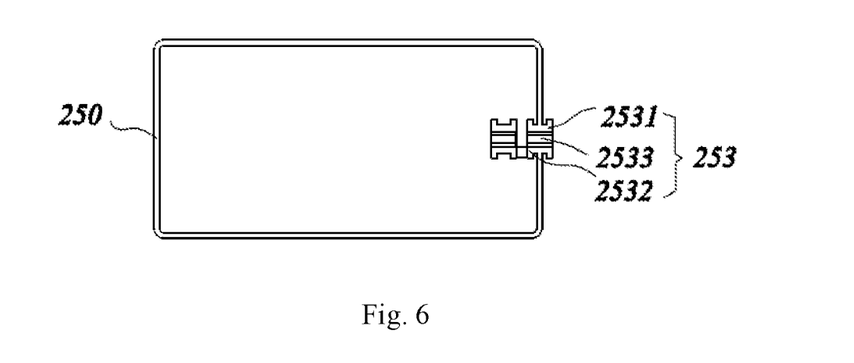
FIG. 6 is a top view of a seal according to an embodiment of the present invention.
Figure 7:
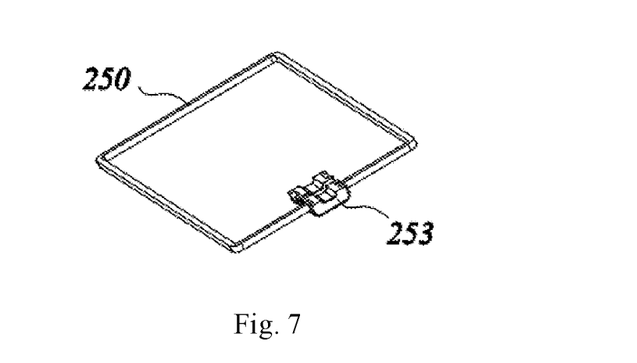
FIG. 7 is a schematic structural diagram of the seal according to an embodiment of the present invention.

Referring to FIGS. 6 and 7, the seal section 253 comprises two H-shaped members connected flexibly and capable of being buckled with each other to form a mounting state in which the H-shaped members are fitted with the notch 251. The H-shaped member has first and second arms 2531 and 2532 parallel with each other, and a connecting portion 2533 for connecting the first and second arms 2531 and 2532. The first and second arms 2531 and 2532 may be in cooperation to clamp the side wall of the sealing box 200 at an edge of the notch 251 therebetween, so as to prevent the seal section 253 from falling off from the notch 251. The connecting portion 2533 passes through the notch to connect the first and second arms 2531 and 2532. The connecting portion 2533 has a concave arcuate surface. When the H-shaped members are buckled with each other, a hollow cavity is enclosed by the arcuate surfaces thereof for the wire to pass through.

When a plurality of wires pass through the notch 251 as a whole, since the wires have circular sections, the sealability may be reduced due to gaps formed between the wires. In this case, the connecting portion 2533 may have a wavy arcuate surface (not shown), so as to form a plurality of hollow cavities independent from each other when mounted, thereby better sealing the wires with the circular sections.

Figure 8:
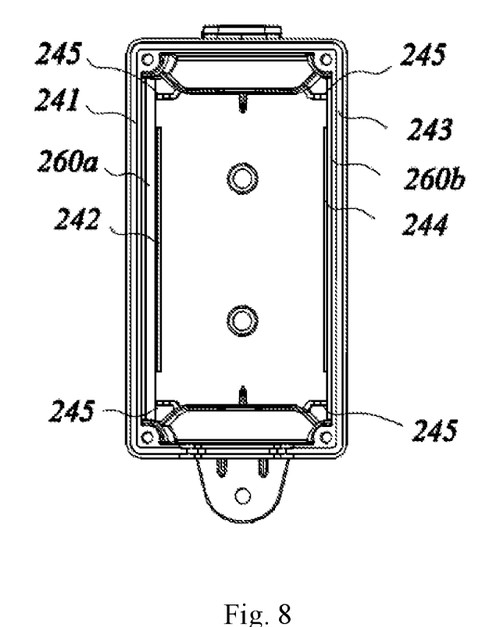
FIG. 8 is a top view of a lower sealing body according to an embodiment of the present invention.

Referring to FIG. 8, a plurality of metal sheets 260 are arranged in the sealing box 200 between the vacuum pump 100 and the side walls of the sealing box 200. Since the metal sheet 260 has a high density, sounds are insulated, and effects of sound insulation and noise reduction may be achieved.

Preferably, the metal sheet 260 is configured as an aluminum sheet, a steel sheet or a galvanized sheet.

Figure 9:
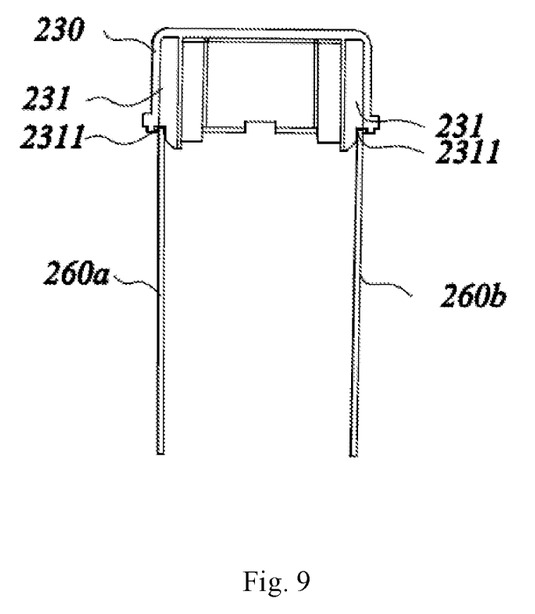
FIG. 9 is a schematic diagram of mounting an upper sealing body and metal sheets according to an embodiment of the present invention.

Referring to FIGS. 8 and 9, in an embodiment of the present invention, two metal sheets 260a and 260b are provided to be attached to two opposite walls of the sealing box 200 respectively. Limiting structures are arranged on the lower and upper sealing bodies 240 and 230 respectively to fix the metal sheets 260a and 260b.

As shown in FIG. 8, first and second ribs 242 and 244 are arranged on the bottom wall of the lower sealing body 240, wherein the first rib 242 is parallel with and spaced apart from the side wall 241 by a distance d, and the second rib is parallel with and spaced apart from the side wall 243 by a distance D. The side wall 241 is opposite to the side wall 243, d is configured as a thickness of the metal sheet 260a, and D is configured as a thickness of the metal sheet 260b. The spacing between the first rib 242 and the side wall 241 serves as a limiting groove for the metal sheet 260a, the spacing between the second rib 244 and the side wall 243 serves as a limiting groove for limiting the metal sheet 260b, and the limiting grooves define horizontal displacements of the metal sheets 260a and 260b respectively.

Figure 10:
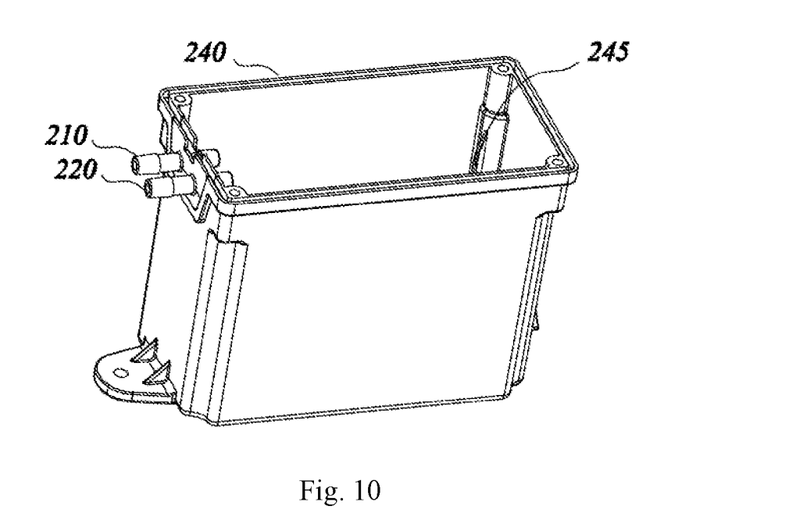
FIG. 10 is a schematic structural diagram of the lower sealing body according to an embodiment of the present invention.

Referring to FIGS. 8 and 10, a plurality of guide grooves 245, further arranged on the lower sealing body 240, extend in a vertical direction consistent with inserting directions when the metal sheet 260 is mounted, and are configured for guiding the metal sheets 260 to be mounted at preset positions.

As shown in FIG. 9, a plurality of abutting parts 231 are arranged on the upper sealing body 230. When the upper sealing body 230 is buckled with the lower sealing body 240, the abutting parts 231 just abut against top of the metal sheet 260. A step 2311 is provided at an end of the abutting part 231 coming in contact with the metal sheet 260, and a reverse U-shaped space is formed by the step 2311 in cooperation with the side walls of the upper sealing body 230, so as to accommodate the top of the metal sheet 260. A top surface of the step 2311 abuts against a top surface of the metal sheet 260, such that the vertical displacement of the metal sheet may be limited; a side surface of the step abuts against a side surface of the metal sheet 260, such that the horizontal displacement of the metal sheet may be limited.

The metal sheet 260 is attached to the side wall of the sealing box 200. Vibrations of the vacuum pump 100 may cause resonances of the metal sheet 260, and new noises are formed and conducted outwards through the walls of the sealing box 200. The above-mentioned limiting structure defines position of the metal sheet 260 strictly and avoids the resonances generating noises.

In an embodiment of the present invention, the notch 246 for an air pipe assembly to pass through is provided at either the upper or lower sealing body 230 or 240 or a joint part of the upper and lower sealing bodies 230 and 240.

Figure 11:
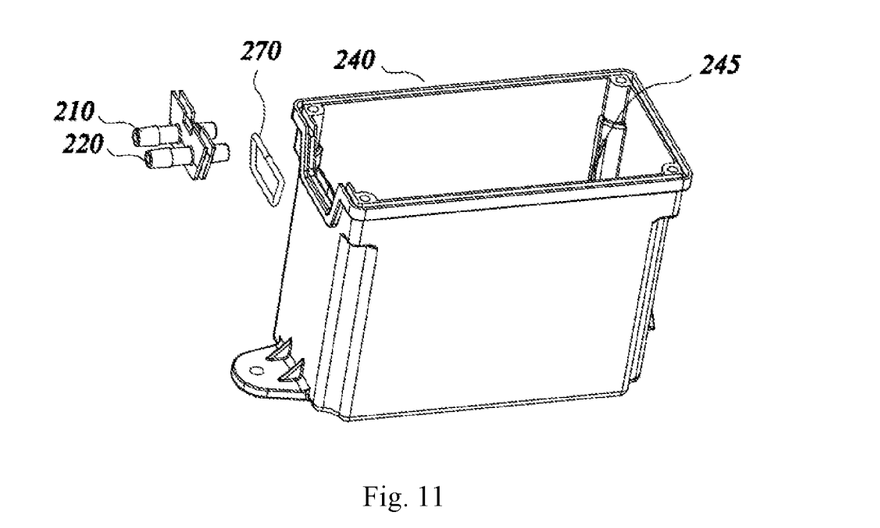
FIG. 11 is a schematic exploded diagram of FIG. 10.

FIGS. 10 and 11 show exemplarily a case where the notch 246 is provided on the lower sealing body 240. The notch 246 is formed at the side wall of the lower sealing body 240 close to an upper edge. A groove is provided on a periphery of the notch 246 to accommodate a sealing unit 270, thereby guaranteeing airtightness of the sealing box 200. The sealing unit 270 has an annular structure made of an elastic material.

The air pipe assembly comprises the air inlet pipe 210, an air outlet pipe 220 and a base plate which are molded integrally. The air inlet pipe 210 and the air outlet pipe 220 penetrate through the base plate, and an outer edge of the substrate and the notch 246 have fitted shapes. A groove is provided at the outer edge of the substrate and fitted with a flange on a periphery of the notch 246, such that the base plate may be clamped at the notch fixedly. The sealing unit 270 is embedded at a gap between the groove and the flange.

The accommodating cavity where the vacuum pump 100 is located has a compact space, which does not facilitate connection and penetration of the air pipeline. By providing the air pipe assembly as an embedded structure, the air pipe assembly may be embedded and fixed into the notch 246 conveniently after connected with the vacuum pump 100, and then the upper and lower sealing bodies 230, 240 are buckled to finish assembly.

Figure 12:
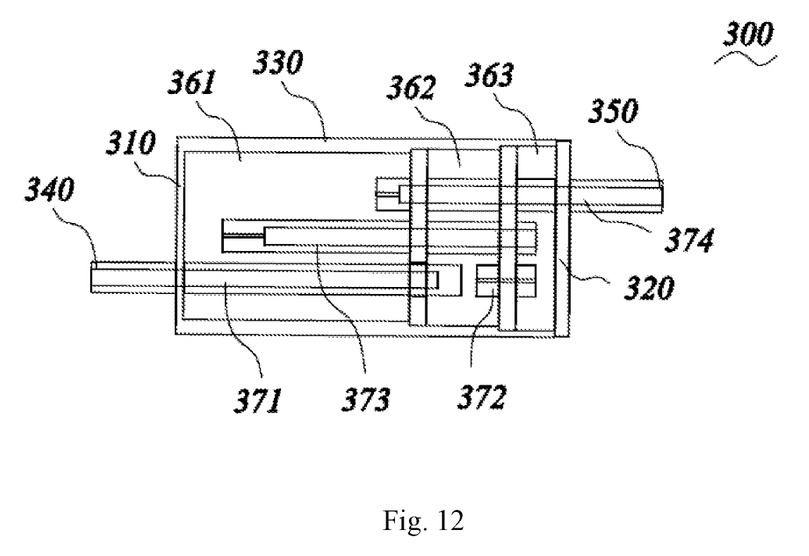
FIG. 12 is a schematic perspective diagram of a silencer according to an embodiment of the present invention.

The air in the air outlet pipe 220 is discharged outside the refrigerator after noise reduction. Referring to FIGS. 1 and 12, in an embodiment of the present invention, the vacuum pump 100 is connected with the silencer 300 through the air outlet pipe 220. The silencer 300 comprises a housing. The housing is enclosed by a first bottom surface 310 located at the proximal end, a second bottom surface 320 located at the distal end and side walls 330 connecting the first and second bottom surfaces 310 and 320, so as to form the hollow cylindrical cavity. An air inlet 340 connected with the air outlet pipe 220 is provided at the proximal end of the silencer 300, and an air outlet 350 is provided at the distal end of the silencer. The cavity is divided into a plurality of chambers in an axial direction, i.e., a direction from the air inlet 340 to the air outlet 350; moreover, at least a part of the chambers has different volumes to remove sounds at different frequency bands correspondingly. Exemplarily, the volumes of the chambers are reduced gradually in the axial direction.

Preferably, three chambers are provided and configured as first, middle and third chambers 361, 362 and 363 from the proximal end to the distal end successively. The first chamber 361 is adjacent to the first bottom surface 310, the second chamber 363 is adjacent to the second bottom surface 320, and the middle chamber 362 is located between the first and second chambers 361 and 362. The air inlet 340 is communicated with the middle chamber 362 through a first duct 371, the middle chamber 362 is communicated with the second chamber 363 through a second duct 372, and the first chamber 361 is communicated with the second chamber 363 through a third duct 373, and the first chamber 361 is communicated with the air outlet 350 through a fourth duct 374.

A plurality of middle chambers 362 may be provided.

The housing of the silencer is not limited to be cylindrical, and may further have a shape of rectangular parallelepiped or an irregular shape.

Sound waves conducted out of the vacuum pump 100 pass through the first, second, third and fourth ducts 371, 372, 373 and 374 successively with airflow, and are reflected and refracted in the middle, second and first chambers 362, 363 and 361 with different volumes successively, and energy will decline gradually. The first, middle and second chambers 361, 362 and 363 correspond to low, intermediate and high frequencies for noise reduction. Further, the first, second, third and fourth ducts 371, 372, 373 and 374 have small inner diameters, such that a part of the energy is converted into heat energy and sapped when the sound waves pass through the ducts.

With such arrangements of the silencer, the sound waves travel as long as possible in the silencer to decrease the energy, and are refracted and reflected in different chambers, and a better noise reduction effect is achieved with a small axial distance of the silencer.

Figure 13:
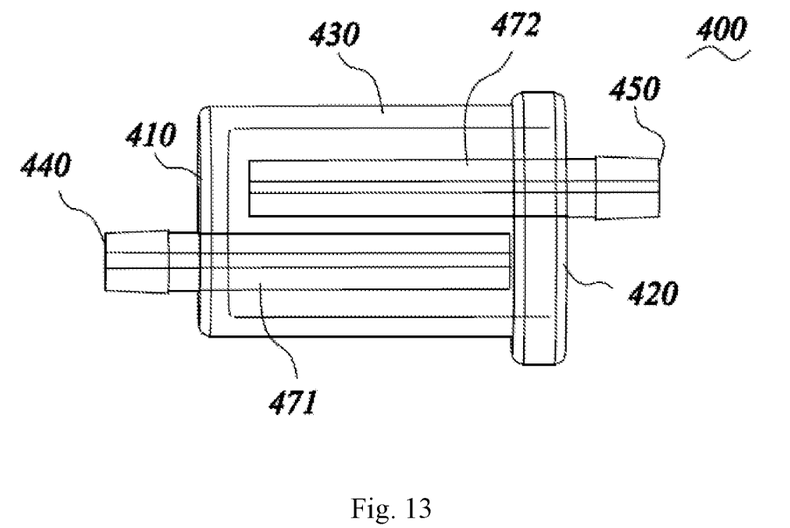
FIG. 13 is a schematic perspective diagram of the silencer according to another embodiment of the present invention.

Referring to FIG. 13, in another embodiment of the present invention, the silencer 400 comprises the housing. The housing is enclosed by the first bottom surface 410 located at the proximal end, the second bottom surface 420 located at the distal end and the side walls 430 connecting the first and second bottom surfaces 410 and 420, so as to form the hollow cylindrical cavity. A single chamber is formed in the cavity. The air inlet 440 connected with the air outlet pipe 220 is provided at the proximal end of the silencer 400, and the air outlet 450 is provided at the distal end of the silencer. The air inlet 440 is communicated with the chamber through the first duct 471, the distal end of which is close to the second bottom surface 420. The chamber is communicated with the air outlet 450 through the second duct 472, the proximal end of which is close to the first bottom surface 420.

The sound waves are reflected and refracted in the chamber, and the energy is declined gradually. The lengths of the first and second ducts 471 and 472 are configured as a quarter of a wavelength of a target audio frequency, so as to remove the sounds at the target audio frequency specifically. Preferably, the target audio frequency is 1,000 Hz.

The first and second ducts 471 and 472 have small inner diameters, such that a part of the energy is converted into heat energy and declined when the sound waves pass through the ducts.

In the noises conducted by the air in the vacuum pump 100, the high frequency noise may not be heard by human ears, and the noise disturbing a user is mainly the low frequency noise. According to the present embodiment, the low frequency noise may be removed targetedly, such that the silencer has a simpler structure.

Figure 14:
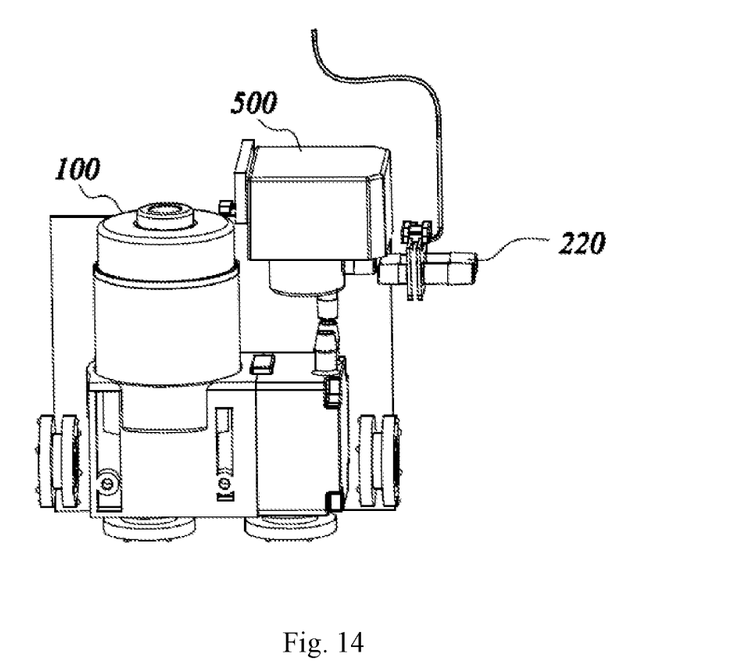
FIG. 14 is a schematic structural diagram of a vacuum pump and the silencer according to another embodiment of the present invention.
Figure 15:
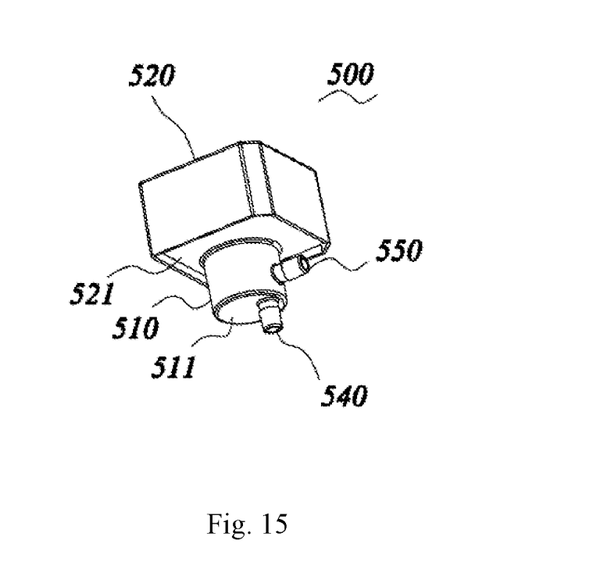
FIG. 15 is a schematic structural diagram of the silencer according to another embodiment of the present invention.

Referring to FIGS. 14 and 15, in still another embodiment of the present invention, the silencer 500 is provided inside the sealing box 200, and connected with the air outlet pipeline of the vacuum pump 100 and the air outlet pipe 220. The silencer 500 comprises the housing. The hollow cavity is enclosed by the housing, for refracting and reflecting the sound waves. The hollow cavity comprises a cylindrical chamber 510 and a chamber 520 with a shape of rectangular parallelepiped, wherein one of the bottom surfaces of the cylindrical chamber 510 is connected with one surface 521 of the chamber 520 with a shape of rectangular parallelepiped, and an interior of the cylindrical chamber 510 is communicated with an interior of the chamber 520 with a shape of rectangular parallelepiped.

A diameter of the bottom surface of the cylindrical chamber 510 is less than or equal to a length of a side of the connected surface 521 of the rectangular parallelepiped chamber 520.

The air inlet 540 and the air outlet 550 are provided at the cylindrical chamber 510 of the silencer at an angle, such that the air is refracted and reflected to reach the air outlet after entering the hollow cavity, and the energy is decreased in this process to realize noise reduction.

Preferably, the air inlet 540 is provided on the bottom surface 511 of the cylindrical chamber 510, and the air outlet 550 is provided on a side surface of the cylindrical chamber 510.

The air inlet 540 and the air outlet 550 have the same inner diameter, so as to balance pressures of the two ports.

According to the present embodiment, the sound waves are reflected and refracted irregularly due to changes in a shape of the hollow cavity, and the energy is declined.

Figure 16:
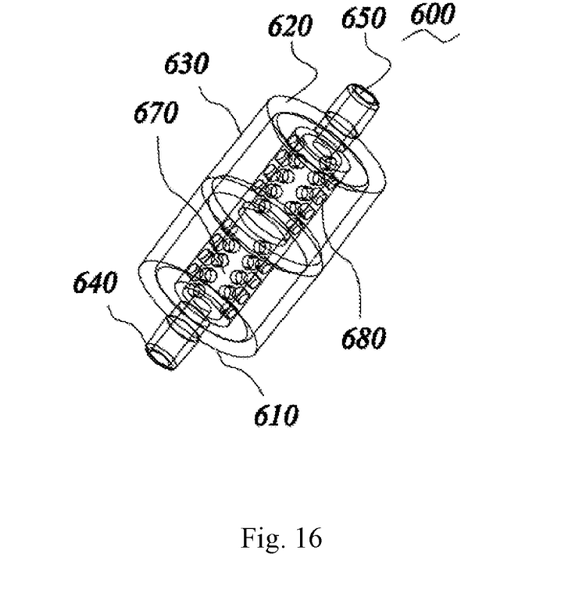
FIG. 16 is a perspective view of the silencer according to another embodiment of the present invention.
Figure 17:
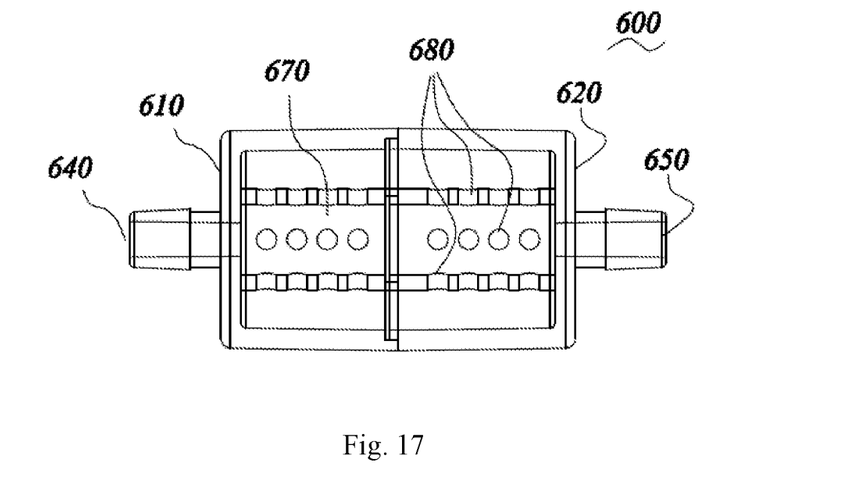
FIG. 17 is a schematic diagram of a longitudinal section of the silencer according to another embodiment of the present invention.

Referring to FIGS. 16 and 17, in another embodiment of the present invention, the silencer 600 comprises the housing, by which the hollow cavity is enclosed. The air inlet 640 is provided at the proximal end of the silencer 600, the air outlet 650 is provided at the distal end of the silencer, and the air inlet 640 is communicated with the air outlet 650 through the duct 670 provided in the housing. A sleeve structure is formed by the duct 670 and the housing. The duct 670 is filled with a medium to absorb the vibration energy of the sound waves and to weaken a sound intensity. Further, the medium is made of silencer cotton.

A plurality of through holes 680 are formed in a side wall of the duct 670, so as to communicate the duct 670 with the cavity. The through holes 680 are distributed in a circumferential direction of the side wall of the duct 670 at intervals. That is, the through holes are formed in the duct 670 in a plurality of directions.

Preferably, the housing is enclosed by the first bottom surface 610 located at the proximal end, the second bottom surface 620 located at the distal end and the side walls 630 connecting the first and second bottom surfaces 610 and 620, so as to form the hollow cylindrical cavity. The air inlet 640 is provided on the first bottom surface 610, and the air outlet 650 is provided on the second bottom surface 620.

Preferably, the through hole has a diameter less than 1 mm.

Preferably, the cavity enclosed by the housing is divided into the plurality of chambers arranged from the proximal end to the distal end.

The sound waves from the vacuum pump 100 enter the duct 670 from the air inlet 640, are subjected to noise reduction by means of the medium and then reach the air outlet 650. The sound waves at a specific frequency are attenuated, and the sound intensity is weakened. In this process, a part of the sound waves is diffracted by the through holes 680 into the hollow cavity, refracted and reflected in the hollow cavity and further attenuated.

With such arrangements of the silencer, in conjunction with noise reduction by means of the medium and the hollow cavity and diffraction of the sound waves by small holes, the sound intensity is reduced in plural ways.

It should be understood that although the description is described according to the above embodiments, each embodiment may not only include one independent technical solution. The presentation manner of the description is only for the sake of clarity. Those skilled in the art should take the description as an integral part. The technical solutions of the respective embodiments may be combined properly to form other embodiments understandable by those skilled in the art.

The above detailed description only illustrates the feasible embodiments of the present invention, and is not intended to limit the protection scope of the present invention. Equivalent embodiments or modifications within the scope and spirit of the present invention shall be embraced by the protection scope of the present invention.

What is claimed is:

1. A vacuum assembly for a refrigerator, comprising:
   an upper sealing body and a lower sealing body, which are buckled to define a sealed accommodating cavity;
   a vacuum pump, provided in the accommodating cavity;
   a plurality of sheet members, provided in the accommodating cavity and arranged between the vacuum pump and side walls of a sealing box, for sound insulation;
   a plurality of abutting parts, provided on the upper sealing body and abutting against tops of the sheet members when the upper sealing body and the lower sealing body are buckled, a step being provided at an end of the abutting part coming into contact with a corresponding sheet member out of the plurality of sheet members, a top surface of the step abutting against a top surface of the corresponding sheet member, and a side surface of the step abutting against a side surface of the sheet member;
   a plurality of ribs, provided on the lower sealing body and spaced apart from the side walls to define limiting grooves for the sheet members; and
   a plurality of guide grooves, provided on the lower sealing body and extending in a vertical direction to guide the sheet members;
   wherein a notch is provided between the upper sealing body and the lower sealing body to allow a wire connected with the vacuum pump to pass through the notch, a seal section is provided at the notch for sealing the notch.

2. The vacuum assembly for a refrigerator according to claim 1, wherein the upper sealing body and the lower sealing body are configured as plastic bodies.

3. The vacuum assembly for a refrigerator according to claim 1, wherein the sheet members are configured as metal sheets.

4. The vacuum assembly for a refrigerator according to claim 1, wherein each sheet member of the plurality of sheet members is configured as an aluminum sheet, a steel sheet or a galvanized sheet.

5. The vacuum assembly for a refrigerator according to claim 1, wherein the plurality of sheet members are metal sheets, the metal sheets are attached to the side walls.

6. The vacuum assembly for a refrigerator according to claim 1, wherein two sheet members out of the plurality of sheet members are provided adjacently to two opposite side walls of the sealing box respectively.

7. The vacuum assembly for a refrigerator according to claim 1, wherein each rib of the plurality of ribs is parallel with the side wall to limit a horizontal displacement of the plurality of sheet members.

8. The vacuum assembly for a refrigerator according to claim 1, wherein a distance between a rib out of the plurality of ribs and the side wall is configured as a thickness of a corresponding sheet member out of the plurality of sheet members.

9. The vacuum assembly for a refrigerator according to claim 1, wherein the seal section comprises two H-shaped members connected flexibly and capable of being buckled with each other to form a mounting state in which the H-shaped members are fitted with the notch.

10. The vacuum assembly for a refrigerator according to claim 9, wherein each of the H-shaped members has first and second arms parallel with each other, and a connecting portion for connecting the first and second arms, the first and second arms are in cooperation to clamp the side wall of the sealing box at an edge of the notch, so as to prevent the seal section from falling off from the notch, the connecting portion passes through the notch to connect the first and second arms.

11. The vacuum assembly for a refrigerator according to claim 10, wherein the connecting portion has a concave arcuate surface, when the H-shaped members are buckled with each other, a hollow cavity is enclosed by the arcuate surface for the wire to pass through.

12. The vacuum assembly for a refrigerator according to claim 10, wherein the connecting portion has a wavy arcuate surface, so as to form a plurality of hollow cavities independent from each other when mounted for a plurality of wires to respectively pass through the plurality of hollow cavities.

13. The vacuum assembly for a refrigerator according to claim 1, wherein the notch is provided on the lower sealing body, the notch is formed at the side wall of the lower sealing body close to an upper edge, a groove is provided on a periphery of the notch to accommodate the seal section.

14. The vacuum assembly for a refrigerator according to claim 1, wherein a seal ring is provided between the upper sealing body and the lower sealing body, the seal section is made of an elastic material and molded integrally with the seal ring.

15. A refrigerator, comprising a cabinet in which a fresh keeping space is provided, further comprising a vacuum assembly, wherein the vacuum assembly is connected with the fresh keeping space, and the vacuum assembly comprises:
    an upper sealing body and a lower sealing body, which are buckled to define a sealed accommodating cavity;
    a vacuum pump, provided in the accommodating cavity;
    a plurality of sheet members, provided in the accommodating cavity and arranged between the vacuum pump and side walls of a sealing box, for sound insulation;
    a plurality of abutting parts, provided on the upper sealing body and abutting against tops of the sheet members when the upper sealing body and the lower sealing body are buckled, a step being provided at an end of the abutting part coming into contact with a corresponding sheet member out of the plurality of sheet members, a top surface of the step abutting against a top surface of the corresponding sheet member, and a side surface of the step abutting against a side surface of the sheet member;
    a plurality of ribs, provided on the lower sealing body and spaced apart from the side walls to define limiting grooves for the sheet members; and
    a plurality of guide grooves, provided on the lower sealing body and extending in a vertical direction to guide the sheet members;
    wherein a notch is provided between the upper sealing body and the lower sealing body to allow a wire connected with the vacuum pump to pass through the notch, a seal section is provided at the notch for sealing the notch.

16. The refrigerator according to claim 15, wherein the fresh keeping space is configured as an independent compartment or a closed or semi-closed space provided in a compartment.

* * * * *